United States Patent [19]

Maeda et al.

[11] Patent Number: 4,533,698

[45] Date of Patent: Aug. 6, 1985

[54] THERMOPLASTIC RESIN COMPOSITION

[75] Inventors: Tetsuro Maeda; Akihiro Okamoto; Yoshimitsu Shimizu; Takashi Nomoto, all of Ichihara, Japan

[73] Assignee: Denki Kagaku Kogyo Kabushiki Kaisha, Tokyo, Japan

[21] Appl. No.: 482,444

[22] Filed: Apr. 6, 1983

[30] Foreign Application Priority Data

Apr. 13, 1982 [JP] Japan .................................. 57-61394

[51] Int. Cl.$^3$ ........................ C08L 39/04; C08L 51/00
[52] U.S. Cl. ........................................ 525/73; 525/74; 525/75; 525/79; 525/80; 525/82
[58] Field of Search ...................... 525/80, 73, 74, 75, 525/79, 82

[56] References Cited

U.S. PATENT DOCUMENTS 3,655,829  4/1972  Ronzoni et al. ...................... 525/228

Primary Examiner—Jacob Ziegler
Attorney, Agent, or Firm—Oblon, Fisher, Spivak, McClelland & Maier

[57] ABSTRACT

A thermoplastic resin composition consists essentially of (A) 100 parts by weight of a rubber-containing styrene type resin and (B) 1 to 45 parts by weight of a polymeric substance selected from the group consisting of a homopolymer of an acrylic acid ester, copolymers of an acrylic acid ester, and a mixture of these polymers, said component (B) having a solubility parameter of from 8.4 to 9.8 $(cal/c.c.)^{\frac{1}{2}}$, a glass transition temperature of 20° C. or below, a gel content of 70% by weight or below, and relative viscosity of a substance soluble in methylethyl ketone of 20 or below.

10 Claims, No Drawings

THERMOPLASTIC RESIN COMPOSITION

This invention relates to a thermoplastic resin composition which is excellent in its environmental stress crack resistance and yet has an improved heat stability.

It has been observed that, when a rubber-containing styrene type resin is in contact with chemicals in a stress-loaded condition, there occur cracks in it, and, in an extreme case, there emerges rupture phenomenon in the resin. Such phenomenon is called "the environmental stress crack phenomenon", and can be distinctly observed when the resin is brought in contact with those chemicals such as alcohol, carboxylic acid, alkane, alkene, and so forth, having not so high a solubility to the resin, as has already been well known.

This phenomenon takes place when a strain produced at the time of shaping the resin material and remaining in the interior of the shaped article is released upon its contact with the chemicals, even if no external force is exerted to the shaped article of the resin. On account of this phenomenon, a great deal of restriction is imposed on the use of the rubber-containing styrene type resin.

It has so far been known that a content of the rubber component and a molecular weight of the resin component constitute factors to affect the environmental stress crack resistance of the rubber-containing styrene type resin. This environmental stress crack resistance of the resin can be improved to some extent by increasing the content of the rubber component or the molecular weight of the resin component. However, the effect thereby obtainable is not yet adequate from the practical standpoint.

It has recently been reported by the inventors of the present invention that the environmental stress crack resistance of the rubber-containing styrene type resin can be improved remarkably by blending a copolymer containing therein fatty acid vinyl ester with the rubber-containing styrene type resin.

However, while the resin compositions obtained by the prior invention were remarkable in their effect of improving the environmental stress crack resistant property, they were difficult to be shaped under the same shaping condition as that for shaping the rubber-containing styrene type resin, because the heat stability of the compolymer containing therein fatty acid vinyl ester was inferior to that of the rubber-containing styrene type resin. For instance, with a copolymer containing therein vinyl acetate, there takes place considerable acetic acid removing reaction from a temperature level in the vicinity of 230° C. On account of this, when the rubber-containing styrene type resin blended with the copolymer is shaped at a temperature above 230° C., not only there occur unsatisfactory phenomena in the outer appearance of the shaped article such as discoloration, decrease in luster, and so on, but also, in an extreme case, there take place corrosion phenomena in the cylinder of the molding machine, screw, metal mold, etc. owing to acetic acid exuded from it. Improvements in this respect has been longed for. For this purpose, there have heretofore been proposed various methods for improving the heat stability of the copolymer containing therein fatty acid vinyl ester (e.g., Japanese patent application No. 79766/1981), none of which was yet satisfactory in its stabilizing effect under severe forming conditions.

The present invention is directed to solution of the above-described shortcomings inherent in the conventional rubber-containing styrene type resin, and characterized by a blend composed of (A) 100 parts by weight of a rubber-containing styrene type resin, and (B) 1 to 45 parts by weight of a homopolymer or copolymers of acrylic acid ester or a mixture of these homopolymer and copolymers, in which the component (B) has a solubility parameter of from 8.4 to 9.8 $(cal/c.c.)^{\frac{1}{2}}$, a glass transition temperature of 20° C. or below, a gel content of 70% by weight or below, and a relative viscosity of substances soluble in methyl ethyl ketone of 20 or below.

That is to say, according to the present invention, it is possible to readily provide, under the ordinary shaping conditions of the rubber-containing styrene type resin, a shaped article of thermoplastic resin with remarkably improved heat stability and being free from unsatisfactory phenomena in the external appearance of the shaped article such as discoloration, decreased luster, etc. even under severe shaping conditions; free from corrosion phenomena in the shaping machine since no decomposed gas of corrosive nature will be generated; and excellent in the environmental stress crack resistance.

The foregoing objects, other objects as well as specific details of the thermoplastic resin composition according to the present invention will become more apparent and understandable from the following description thereof.

The monomer to constitute the rubber component of the rubber-containing styrene type resin as the component (A) of the present invention is selected from butadiene, isoprene, dimethyl butadiene, chloroprene, cyclopentadiene, and other conjugated diene monomers; 2,5-norbornadiene, 1,4-cyclohexadiene, 4-ethylidene norbornene, and other non-conjugated diene monomers; styrene, α-methyl styrene, vinyl toluene and other styrene type monomers; acrylonitrile, methacrylonitrile and other nitrile monomers; methylmethacrylate, ethyl acrylate, butyl acrylate, hexylacrylate, octylacrylate, and other (meth)acrylic acid ester monomers; and ethylene, propyrene, 1-butene, isobutylene, 2-butene and other olefin monomers. These monomeric compounds are used in the form of a homopolymer or copolymers. Also, using a cross-linking monomer, copolymerization of polyfunctional vinyl monomers can be effected. For such polyfunctional vinyl monomer, there are divinyl benzene, ethylene glycol dimethacrylate, 1,3-butylene glycol dimethylacrylate, 1,4-butylene glycol dimethacrylate, propylene glycol dimethacrylate, triallyl cyanurate, triallyl isocyanurate, trimethylol propane trimethacrylate, allyl acrylate, allylmethacrylate, vinyl acrylate, vinyl methacrylate, glycidyl acrylate, glycidyl methacrylate, and so on.

The rubber component for use in the component (A) of the present invention is required to have a graft activity point. More concretely, it should preferably have a carbon-to-carbon double bond in the rubber molecules.

There is no particular limitation to the method for polymerizing the above-listed monomers, and any of the well known technique such as emulsion-polymerization, solution-polymerization, and so forth can be employed.

The rubber component in the component (A) is not necessarily limited to one kind, but a blend of two or more kinds of rubber components, each of which has been polymerized separately, may also be used.

For the monomer to constitute the resin component of the rubber-containing styrene type resin as the component (A) of the present invention, there are: styrene, α-methyl styrene, vinyl toluene, t-butyl styrene, and other styrene type monomers; acrylonitrile, methacrylonitrile and other nitrile monomers; and methylmethacrylate, ethylacrylate, butylacrylate, hexylacrylate, octylacrylate and other (meth)acrylic acid ester monomers. These monomers are used in the form of their homopolymers or copolymers, in which a styrene type monomer should essentially be contained.

The component (A) for use in the present invention consists of the rubber component and the resin component as mentioned in the foregoing. In addition, it is necessary that a grafting structure should be present in the interface between the rubber component in a spherical structure and the resin component in a continuous phase. Such structure can be attained by the so-called "graft polymerization method", in which a part or whole of the monomer constituting the resin component is polymerized in the presence of the rubber component, as has so far been well known. Therefore, the component (A) of the present invention can be produced by the well-known graft polymerization technique.

While it is possible to blend those separately polymerized resin components with the component (A) for the purpose of adjusting the content of the rubber component in it, the separately polymerized resin component is not required to have the identical composition with that of the resin composition obtained from the graft polymerization. For instance, it is feasible to blend a resin component obtained by co-polymerizing acrylonitrile, styrene, and α-methylstyrene with the component (A) obtained by the graft polymerization of acrylonitrile, styrene, and methylmethacrylate in the presence of polybutadiene.

Concrete examples of the component (A) of the present invention are as follows: high impact polystyrene, ABS (acrylonitrile, butadiene and styrene) resin, heat-resistant ABS (acrylonitrile, butadiene, styrene, and α-methyl styrene) resin, AAS (acrylonitrile, acrylic acid ester, and styrene) resin, AES (acrylonitrile, EPDM, and styrene) resin, MBAS (methylmethacrylate, butadiene, acrylonitrile, and styrene) resin, and so forth.

Next, the component (B) of the present invention is a homopolymer or copolymers of acrylic acid ester, or a mixture of these homopolymer and copolymers.

Monomers for producing these polymers may be chosen from the following: (1) as the acrylic acid ester monomers, there are methylacrylate, ethylacrylate, butylacrylate, non-cyclic hexylacrylate, cyclohexylacrylate, octylacrylate, hydroxyethylacrylate, methoxy ethyl acrylate, and others; (2) as the other copolymerizable monomers, there are styrene, α-methyl styrene, t-butyl styrene, and other styrene type monomers; acrylonitrile, methacrylonitrile, and other nitrile monomers; methylmethacrylate, butylmethacrylate, and other methacrylic acid ester monomers; ethylene, propylene, 1-butene, isobutylene, 2-butene, and other olefin monomers; and methyl vinyl ether, ethyl vinyl ether, butyl vinyl ether, and other vinyl ether monomers.

The component (B) of the present invention can be obtained by copolymerization of poly-functional vinyl monomers. Such polyfunctional vinyl monomers may be selected from the following: divinyl benzene, ethylene glycol dimethacrylate, 1,3-butylene glycol dimethacrylate, 1,4-butylene glycol dimethacrylate, propylene glycol dimethacrylate, triallyl cyanurate, triallyl isocyanurate, trimethylol propane trimethacrylate, allylacrylate, allylmethacrylate, vinyl acrylate, vinyl methacrylate, glycidyl acrylate, glycidyl methacrylate, and so forth.

The component (B) makes it essential to include acrylic acid ester, but it may be a mixture of two or more kinds of the component (B).

The fact that the resin with its environmental stress crack resistant property having been improved remarkably can be obtained by blending a copolymer containing therein fatty acid vinyl ester with the rubber-containing styrene type resin is as disclosed in Japanese unexamined patent publication No. 147841/1981, and the characteristic feature of the present invention resides in that a function which is comparable to that of the copolymer containing therein fatty acid vinyl ester is caused to emerge in the polymer containing therein acrylic acid ester which is the component (B) of the present invention and has high heat stability. The "function" as referred to herein is meant by, in one aspect, a good compatibility (or miscibility) with the rubber-containing styrene type resin, and, in another aspect, improvement (or increase) in the environmental stress crack resistant property of the rubber-containing styrene type resin; and, in still another aspect, maintenance of various favorable properties the rubber-containing styrene type resin possesses. In order to cause the polymer containing therein acrylic acid ester to exhibit such function, it is necessary that the solubility parameter, the glass transition temperature, the gel content, and the relative viscosity of the polymer be controlled.

On the other hand, the component (B) of the present invention is required to have the solubility parameter of from 8.4 to 9.8 (cal/c.c.)$^{\frac{1}{2}}$, preferably from 8.8 to 9.6 (cal/c.c.)$^{\frac{1}{2}}$. The solubility parameter as used here is based on the values of the solubility parameter described in "Polymer Handbook" published by John Wiley * Sons. The solubility parameter $\delta_T$ of the copolymer is calculated from the following equation (1):

$$\delta_T = \sum_{n=1}^{m} \delta_n W_n / \sum_{n=1}^{m} W_n \ [(\text{cal/c.c.})^{\frac{1}{2}}] \quad (1)$$

where: $\delta_n$ is the solubility parameter of a homopolymer made up of individual vinyl monomers constituting the copolymer composed of m kinds of vinyl monomers and $W_n$ denotes their weight ratio.

For example, when the solubility parameters of poly(butylacrylate) and poly(ethylacrylate) are respectively determined as 8.8 (cal/c.c)$^{\frac{1}{2}}$ and 9.4 (cal/c.c.)$^{\frac{1}{2}}$, the solubility parameter of a copolymer consisting of 70% by weight of poly(butylacrylate) and 30% by weight of poly(ethylacrylate) is calculated to be 9.0 (cal/c.c.)$^{\frac{1}{2}}$.

When the solubility parameter does not reach 8.4 (cal/c.c.)$^{\frac{1}{2}}$, or exceeds 9.8 (cal/c.c.)$^{\frac{1}{2}}$, the chemical resistant property of the resin blended with the component (A) becomes unfavorably lowered.

The component (B) according to the present invention is required to have its glass transition temperature of 20° C. or below, or preferably 10° C. or below. However, when the glass transition temperature exceeds 20° C., the impact strength of the resin obtained by blending with the component (A) is low, and the environmental stress crack resistant property thereof cannot be improved.

The component (B) of the present invention is required to contain 70% by weight or less of gel. The gel content as used here was found in terms of [(weight of filtered residue)/(weight of component (B))]×100 (%) by drying a filtered residue obtained through filtration of 1% by weight solution of methylethyl ketone as the component (B) through a 200-mesh stainless steel filter net at a temperature of 30° C. When the gel content of the component (B) exceeds 70% by weight, the environmental stress crack resistant property of the resin obtained by blending with the component (A) lowers unfavorably.

As the factors in the polymerization process which affects the gel content in the component (B), there are: (a) kinds of the monomers constituting the copolymer; (b) adding quantity of polyfunctional vinyl monomer; and (c) adding quantity of a chain transfer agent. For example, the gel content increases by increase in the adding quantity of acrylonitrile, increase in the adding quantity of ethylene glycol dimethacrylate, or decrease in the adding quantity of t-dodecyl mercaptan. Accordingly, the component (B) of a desired property can be designed by taking into consideration the other properties required by the component (B), and combining these factors.

The component (B) of the present invention is required to have its relative viscosity of 20 or below, or preferably 10 or below. The relative viscosity here was measured by use of an Ostwald viscometer, i.e., 1% by weight solution of methylethyl ketone in the component (B) was measured at a temperature of 30° C. The component (B) of the present invention contains therein a substance insoluble in methylethyl ketones in some cases. When measuring the relative viscosity of a specimen containing such insoluble substance to methylethyl ketone, the specimen was screened by a 200-mesh metal net to remove the insoluble substance from it. When the relative viscosity of the component (B) exceeds 20, the fluidity of the resin obtained by blending with the component (A) lowers unfavorably.

In order to maintain the relative viscosity of the component (B) below 20, a chain transfer agent is required to be added at the time of polymerizing the component (B). For the chain transfer agent, there may be used: butyl mercaptan, hexyl mercaptan, octyl mercaptan, n-dodecyl mercaptan, 5-dodecyl mercaptan, thioglycolic acid, ethyl thio-glycolate, butyl thio-glycolate, ethyl o-mercapto benzoate, 1-naphthyl disulfide, sulfer, and other sulfer compounds; halogen compounds such as carbon tetrabromide; hydrocarbon such as limonene, terpinolene, and so forth; nitro compounds such as trinitrophenol, trinitrobenzene, and so on; benzoquinone; and others.

As described in the foregoing, the component (B) of the present invention makes it essential to contain in it monomer of acrylic acid ester, and is obtainable by positively controlling the three factors of (a) monomers for producing the copolymer, (b) poly-functional vinyl monomers, and (c) chain transfer agent, and then blending it with the component (A) to produce the component (B) which exhibits favorable physical properties. When the component (B) is required to have rigid compatibility with the component (A), copolymerization of the poly-functional vinyl monomers is preferred, the adding quantity of which is 0.05% by weight or more with respect to the total quantity of the monomers to be used for the polymerization. By the copolymerization of the poly-functional vinyl monomers, it becomes possible to prevent a laminar peeling phenomenon from taking place, the phenomenon of which is observed from time to time when the resin obtained by blending with the component (A) is subjected to shaping process.

Although there is no particular restriction to adoption of the polymerization process of the component (B) according to the present invention, its production by the emulsion-polymerization method is the most advantageous from the industrial standpoint, in which case the well known technique of the emulsion polymerization method can be applied as it is.

According to the present invention, 100 parts by weight of the component (A) and 1 to 45 parts by weight, preferably 3 to 30 parts by weight, of the component (B) are blended. When the content of the component (B) does not reach 1 part by weight, the effect of improvement in its environmental stress crack resistant property is not sufficient, and, on the other hand, when the content exceeds 45 parts by weight, not only the effect of improvement becomes saturated, but also the tensile strength remarkably lowers unfavorably.

In the present invention, it is necessary to blend the components (A) and (B). The blending can be done by well known methods, i.e., both components in emulsion, in granules, or in molten form are mixed and kneaded in their molten state, thereby readily obtaining a polymer blend. In case the component (B) is produced by the emulsion-polymerization, the component (B) in latex is mixed with the component (A) in emulsion, in granules, or in molten state, and kneaded in their molten state simultaneously with, or subsequent to, the dehydration process. Examples of the melting and kneading device are: a Bumbury's mixer, an intensive mixer, a mixtruder, a co-kneader, an extruder, and rolls. Further, it is also possible to use the manufacturing method disclosed in Japanese unexamined patent publication No. 131656/1981.

Further, in the present invention, it is possible to add various other additive than those above-mentioned such as, for example, pigments, dyes, stabilizers, dispersants, reinforcing agent, fillers, lubricants, and so on.

As stated in the foregoing, the present invention provides a composition, in which the acrylic acid ester type polymer is added to the rubber-containing styrene type resin, and provides a styrene type resin having excellent heat stability, mechanical strength, and shaping property of the rubber-containing styrene type resin.

With a view to enabling those skilled in the art to put the present invention into practice, several preferred examples thereof will be presented, from which the present invention will also become more understandable in its details. (It should be noted incidentally that the indications of "part(s)" and "%" in these examples are all "by weight".

EXAMPLE 1

38 parts of powder material (A-1) and 52 parts of powder material (A-6), both in Table 1, and 2.5 parts of stearic acid sorbitan ester were mixed with 10 parts of the component (B) in latex (solid substance) in Table 2 in a Henschel mixer, after which the mixture was fed into a unidirectionally rotating, double-shaft kneader-extruder (Model TEM-50 manufactured by Toshiba Kikai Kabushiki Kaisha (Toshiba Machinery Co.), Japan), and pelletized.

The thus obtained pellets were then molded into shaped articles, and their physical properties were evaluated. The results of evaluation are shown in Table 4 (Experiment Nos. 1 to 12).

EXAMPLE 2

The powder materials (A-1) and (A-6) in Table 1, and the latex (B-1) in Table 2 were mixed with 2.5 parts of stearic acid sorbitan ester at their respective mixing ratios as shown in Table 5, and the mixture was treated in the same manner as in Example 1 above, followed by pelletizing the same.

The thus obtained pellets were molded into shaped articles, and their physical properties were evaluated. The results of the evaluation are as shown in Table 5 (Experiment Nos. 13 to 19).

EXAMPLE 3

The component (A) in Table 1 was mixed with the latex (B-1) in Table 2 and 2.5 parts of stearic acid sorbitan ester at their respective mixing ratios shown in Table 6, and then the mixture was treated in the same manner as in Example 1 above, followed by pelletizing the same.

The thus obtained pellets were then molded into shaped articles, and their physical properties were evaluated. The results of the evaluation are as shown in Table 6 (Experiment Nos. 20 to 23).

EXAMPLE 4

38 parts of latex (A-1) in Table 1 (solid substance) and 10 parts of latex (B-1) in Table 2 (solid substance) were mixed, to which aqueous solution of calcium chloride was added. Then, the batch was agitated at a temperature of 95° C. and the resulted deposit was filtered to recover a polymer. The thus obtained polymer was dried, after which it was mixed with 52 parts of the material (A-6) in Table 1 and 2.5 parts of stearic acid sorbitan ester by means of the Henschel mixer, and the mixture was fed to a single-shaft extruder with vent (Model VC-40 manufactured by K. K. Chuo Kikai Seisakusho (Chuo Machinery Manufacturing Co. Ltd.), Japan), and pelletized.

The thus obtained pellets were molded into shaped articles, followed by evaluation of their physical properties. The results of the evaluation indicated that they had a tensile yield point of 3.9 kg/mm$^2$, and Izod impact strength of 35 kg-cm/cm, a melt flow index of 11.4 g/10 min., chemical resistant property of 120 minutes or longer, a heat stability of grade "A", and a peeling property of grade "A".

EXAMPLE 5

38 parts of powder material (A-1) and 52 parts of material (A-6), both in Table 1, and 2.5 parts of stearic acid sorbitan ester were mixed with 10 parts of latex (B-13) in Table 2 (solid substance) by the Henschel mixer. The mixture was then pelletized in the same manner as in Example 1 above.

The thus obtained pellets were molded into shaped articles, and then their physical properties were evaluated. The results of the evaluation indicated that it had an Izod impact strength of 41 kg-cm/cm, a melt-flow index of 12.2 g/10 min., chemical resistant property of 120 min. or longer, heat stability of grade "A", and a peeling property of grade "A".

EXAMPLE 6

38 parts of ABS resin powder consisting of 50% of polybutadiene, 14% of acrylonitrile, and 36% of styrene, and 52 parts of resin powder consisting of 24% of acrylonitrile and 76% of α-methyl styrene were mixed with 10 parts of a latex (B-1) in Table 2 (solid substance) by the Henschel mixer, after which the polymer blend was pelletized in the same manner as in Example 1 above.

The thus obtained pellets were molded into shaped articles, and their physical properties were evaluated. The results indicated that they had an Izod impact strength of 23 kg-cm/cm, a melt-flow index of 6.2 g/10 min., chemical resistant property of 120 minutes or longer, heat stability of grade "A", and peeling property of grade "A".

COMPARATIVE EXAMPLE 1

38 parts of powder material (A-1) and 52 parts of a material (A-6), both in Table 1, and 2.5 parts of stearic acid sorbitan ester were mixed with 10 parts of latex (solid substance) as the component (B) in Table 3. The mixture was then treated in the same manner as in Example 1 above, and the physical property thereof was evaluated.

The results of the evaluation are as shown in Table 7 (Experiment Nos. 24 to 28).

COMPARATIVE EXAMPLE 2

38 parts of powder material (A-1) and 52 parts of a material (A-1), both in Table 1, and 2.5 parts of stearic acid sorbitan ester were mixed with 10 parts of a copolymer of ethylene and vinyl acetate (at a ratio of 15/85), and the physical property thereof was evaluated. The results of the evaluation revealed that it had a tensile strength of 3.7 kg/mm$^2$, and Izod impact strength of 40 kg-cm/cm, a melt-flow index of 10.0 g/10 min., chemical resistant property of 120 minutes or longer, heat stability of grade "C", and peeling property of grade "A", from which it is seen that the heat stability of the polymer was not satisfactory.

COMPARATIVE EXAMPLE 3

38 parts of powder material (A-1) and 17 parts of a material (A-6), both in Table 1, 45 parts of latex (B-1) in Table 2 (solid substance), and 2.5 parts of stearic acid sorbitan ester were treated in the same manner as in Example 1 above, and then the physical properties thereof were evaluated.

The results of the evaluation revealed that the polymer had a tensile strength of 2.3 kg/mm$^2$, an Izod impact strength of 42 kg-cm/cm, a melt-flow index of 15.8 g/10 min., chemical resistant property of 120 minutes or longer, heat stability of grade "A", peeling property of grade "A", from which it is seen that the resin was considerably low in its rigidity.

COMPARATIVE EXAMPLE 4

The evaluated results of the physical properties of the component (A) alone are shown in Table 8 (Experiment Nos. 29 to 33).

In the foregoing examples and comparative examples, note should be taken of that those measured values of the physical properties of the resin composition according to the present invention were obtained in accordance with the following prescribed methods.

(1) Tensile yield point is measured in accordance with JIS K 6871.

(2) Izod impact strength is measured in accordance with JIS K 6871.

(3) Melt-flow index is measured in accordance with JIS K 7210 (at a temperature of 250° C. and under a load of 5 kg).

(4) Test method for chemical resistant property is as follows: a test piece of a JIS K 7113, No. 1 type was flexured for 50 mm, then the test piece was fixed to a jig, onto which ethylene glycol monoethyl ether was coated; and the material was allowed to stand at a temperature of 23° C. A time period until the test piece reached its fracture was denoted by "minute".

(5) Test method for heat stability is as follows: a resin is stayed for ten minutes within a cylinder of an injection molding machine of 2-ounce capacity with the cylinder temperature being maintained at 250° C.; then the resin is injection-molded, and a shaped article (a flat plate of 50 mm×80 mm×3 mm) at the third shot was measured for its degree of whiteness $W_{10}$ by use of a color and color-difference meter, Model ND-101DC, manufactured by Nippon Denshoku Kogyo K.K.

Besides the above, another shaped article of the same dimension was made by the injection-molding using the same injection molding machine under the same conditions as mentioned above, but without performing the resin staying operation, and then the degree of whiteness $W_0$ of the shaped article was measured.

Using these two shaped articles, a rate of change in the whiteness was found by the following equation.

Rate of change in whiteness $(WD) = (W_0 - W_{10})/W_0 \times 100$ $WD < 10$ is evaluated as grade "A", $10 \leq WD < 20$ as grade "B", and $WD \geq 20$ as grade "C". With the resin of $WD \geq 20$, there occurs a difference in $W_0$ of the shaped article at a slight variations in the shaping temperature, even if the shaped article is the one that has been injected without performing the resin staying operation, which is not preferable.

(6) Test method for peeling property is as follows: using an injection molding machine of 2-ounce capacity with a temperature of its cylinder being maintained at 200° C., a shaped article (a flat plate of 50 mm×85 mm×2 mm) was molded, and a condition of a broken piece of a tab gate portion (8.5 mm×18 mm×2 mm) thereof, when it was broken by manually bending it, was observed. The specimen, in which no peeling phenomenon can be observed at all, is evaluated as grade "A", the specimen, in which considerable irregularity is observed on its broken surface, is evaluated as grade "B", and the specimen, in which apparent peeling in a thin film form is observed, is evaluated as grade "C".

(7) Solubility parameter . . . the values of the solubility parameter as used in the present specification are as follows (unit of measurement = $(cal/c.c.)^{\frac{1}{2}}$).

| Poly(butylacrylate) | 8.8 |
| Poly(ethylacrylate) | 9.4 |
| Poly(methylmethacrylate) | 9.5 |
| Poly(acrylonitrile) | 12.5 |
| Poly(styrene) | 9.1 |

Although the present invention has so far been described with reference to preferred examples thereof, it should be understood that these examples are merely illustrative of the present invention and not so restrictive, and that any changes and modifications may be made by those skilled in the art within the spirit and scope of the invention as set forth in the appended claim.

TABLE 1

| Specimen No. | Polybutadiene (%) | SBR rubber (%) | EPDM rubber (%) | Acrylic rubber (%) | Acrylonitrile (%) | Styrene (%) | Methylmethacrylate (%) | Shape |
|---|---|---|---|---|---|---|---|---|
| A-1 | 40 | 0 | 0 | 0 | 18 | 42 | 0 | Powder or latex |
| A-2 | 25 | 15 | 0 | 0 | 15 | 45 | 0 | Powder |
| A-3 | 40 | 0 | 0 | 0 | 13 | 40 | 7 | Powder |
| A-4 | 0 | 0 | 28 | 0 | 28 | 64 | 0 | Pellet |
| A-5 | 0 | 0 | 0 | 22 | 20 | 58 | 0 | Powder |
| A-6 | 0 | 0 | 0 | 0 | 30 | 70 | 0 | Powder |

TABLE 2

| | Composition and Property of Acrylic Acid Ester Type Polymer (Component (B)) | | | | | | | | | | |
|---|---|---|---|---|---|---|---|---|---|---|---|
| Specimen No. | n-butyl acrylate (parts) | Ethyl acrylate (parts) | Methylmethacrylate (parts) | Acrylonitrile (parts) | Styrene (parts) | t-dodecyl mercaptan (parts) | Ethylene glycol dimethacrylate (parts) | Glass transition temperature (°C.) | η rel | Gel content (%) | Solubility parameter $(cal/c.c.)^{\frac{1}{2}}$ |
| B-1 | 70 | 0 | 30 | 0 | 0 | 0.5 | 0.5 | — | 1.40 | 53 | 9.0 |
| B-2 | 70 | 0 | 30 | 0 | 0 | 1.0 | 0.5 | −36 | 1.10 | 3.7 | 9.0 |
| B-3 | 70 | 0 | 24 | 6 | 0 | 0.5 | 0.5 | −31 | 1.45 | 67 | 9.2 |
| B-4 | 70 | 0 | 24 | 6 | 0 | 1.0 | 0.5 | −38 | 1.41 | 55 | 9.2 |
| B-5 | 70 | 0 | 24 | 6 | 0 | 1.0 | 0.5 | −39 | 1.48 | 50 | 9.0 |
| B-6 | 70 | 0 | 30 | 0 | 0 | 0 | 0 | — | 16.4 | 0 | 9.0 |
| B-7 | 70 | 0 | 10 | 20 | 0 | 1.0 | 0.5 | −8 | 1.65 | 0.2 | 9.6 |
| B-8 | 50 | 0 | 50 | 0 | 0 | 1.0 | 0.5 | 6 | 1.72 | 4.0 | 9.2 |
| B-9 | 70 | 0 | 20 | 10 | 0 | 0.5 | 0 | −30 | 1.51 | 0.4 | 9.3 |
| B-10 | 20 | 80 | 0 | 0 | 0 | 0.5 | 0.5 | −26 | 1.77 | 2.8 | 9.3 |
| B-11 | 20 | 80 | 0 | 0 | 0 | 1.0 | 0.5 | −26 | 1.63 | 1.8 | 9.3 |
| B-12 | 20 | 74 | 0 | 6 | 0 | 0.5 | 0.5 | −21 | 1.79 | 32 | 9.5 |
| B-13 | 100 | 0 | 0 | 0 | 0 | 0.5 | 0.25 | −50 | 1.25 | 2.0 | 8.8 |

Note:
Emulsifier . . . sodium dodecylbenzene sulfonate
Polymerization initiator . . . produced by the emulsion polymerization at a temperature of 60° C. using potassium persulfate; solid content in the latex being 40% in all specimen

TABLE 3

Composition and Property of Acrylic Acid Ester Type Polymer (Component (B))

| Specimen No. | n-butyl acrylate (parts) | Ethyl acrylate (parts) | Methyl methacrylate (parts) | Acrylonitrile (parts) | t-dodecyl mercaptan (parts) | Ethylene glycol dimethacrylate (parts) | Glass transition temperature (°C.) | η rel | Gel content (%) | Solubility parameter (cal/c.c.)$^{\frac{1}{2}}$ |
|---|---|---|---|---|---|---|---|---|---|---|
| B-14 | 30 | 0 | 70 | 0 | 1.0 | 0.5 | 50 | 1.57 | 7.0 | 9.3 |
| B-15 | 70 | 0 | 30 | 0 | 1.0 | 2.0 | — | 1.14 | 76 | 9.0 |
| B-16 | 20 | 80 | 0 | 0 | 0 | 0 | −25 | 42 | 0 | 9.3 |
| B-17 | 70 | 0 | 30 | 0 | 0 | 0.5 | — | 1.30 | 93 | 9.0 |
| B-18 | 70 | 0 | 0 | 30 | 1.0 | 0.5 | 2 | 1.57 | 0.16 | 9.9 |

Note:
Method of production is the same for all specimens as those in Table 2; the solid content in the latex is 40% for all specimens.

TABLE 4

| Experiment No. | 1 | 2 | 3 | 4 | 5 | 6 | 7 | 8 | 9 | 10 | 11 | 12 |
|---|---|---|---|---|---|---|---|---|---|---|---|---|
| Kind of component (B) | B-1 | B-2 | B-3 | B-4 | B-5 | B-6 | B-7 | B-8 | B-9 | B-10 | B-11 | B-12 |
| Tensile yield point (kg/mm$^2$) | 3.9 | 3.9 | 3.7 | 3.6 | 3.9 | 3.4 | 3.7 | 3.8 | 3.7 | 3.7 | 3.7 | 3.8 |
| Izod impact strength (kg cm/cm) | 35 | 35 | 34 | 35 | 36 | 40 | 38 | 29 | 41 | 40 | 37 | 40 |
| Melt-flow index (g/10 min.) | 10.8 | 10.9 | 10.8 | 10.0 | 11.4 | 5.4 | 11.7 | 11.1 | 17.1 | 11.3 | 13.5 | 11.5 |
| Chemical resistant property (min.) | >120 | >120 | 44 | >120 | >120 | >120 | 18 | >120 | >120 | >120 | >120 | 73 |
| Heat stability | A | A | A | A | A | A | A | A | A | A | A | A |
| Peeling property | A | A | A | A | A | A | A | A | A | A | A | A |

TABLE 5

| Experiment No. | 13 | 14 | 15 | 16 | 17 | 18 | 19 |
|---|---|---|---|---|---|---|---|
| (A-1) Adding quantity (parts) | 38 | 38 | 38 | 38 | 30 | 45 | 55 |
| (A-6) Adding quantity (parts) | 60 | 57 | 42 | 32 | 60 | 45 | 35 |
| (B-1) Adding quantity (parts) | 2 | 5 | 20 | 30 | 10 | 10 | 10 |
| Tensile yield point (kg/mm$^2$) | 4.3 | 4.2 | 3.4 | 3.0 | 4.7 | 3.6 | 3.0 |
| Izod impact strength (kg cm/cm) | 20 | 29 | 37 | 37 | 12 | 37 | 41 |
| Melt-flow index (g/10 min.) | 9.2 | 10.0 | 11.9 | 13.5 | 17.4 | 7.2 | 5.4 |
| Chemical resistance property (min) | 8.7 | 64 | >120 | >120 | >120 | >120 | >120 |
| Heat stability | A | A | A | A | A | A | A |
| Peeling property | A | A | A | A | A | A | A |

TABLE 6

| Experiment No. | 20 | 21 | 22 | 23 |
|---|---|---|---|---|
| Kind of component (A) | A-2/A-6 | A-3/A-6 | A-4 | A-5 |
| Adding quantity of component (A) (parts) | 38/52 | 38/52 | 90 | 90 |
| Adding quantity of (B-1) (parts) | 10 | 10 | 10 | 10 |
| Tensile yield point (kg/mm$^2$) | 3.5 | 37 | 4.0 | 3.1 |
| Izod impact strength (kg cm/cm) | 31 | 28 | 30 | 26 |
| Melt-flow index (g/10 min.) | 12.2 | 12.7 | 10.3 | 7.0 |
| Chemical resistant property (min.) | >120 | >120 | >120 | >120 |
| Heat stability | A | A | A | A |
| Peeling property | A | A | A | A |

TABLE 7

| Experiment No. | 24 | 25 | 26 | 27 | 28 |
|---|---|---|---|---|---|
| Kind of component (B) | B-14 | B-15 | B-16 | B-17 | B-18 |
| Tensile yield point (kg/mm$^2$) | 4.2 | 3.9 | 3.4 | 3.8 | 3.8 |
| Izod impact strength (kg cm/cm) | 22 | 25 | 44 | 32 | 39 |
| Melt-flow index (g/10 min.) | 8.9 | 10.2 | 3.1 | 6.8 | 12.3 |
| Chemical resistant property (min.) | 2.8 | 6.2 | >120 | 5.3 | 1.2 |
| Heat stability | A | A | A | A | A |
| Peeling property | A | A | C | A | A |

TABLE 8

| Experiment No. | 29 | 30 | 31 | 32 | 33 |
|---|---|---|---|---|---|
| Kind of component (A) | A-1/A-6 | A-2/A-6 | A-3/A-6 | A-4 | A-5 |
| Adding quantity of component (A) (parts) | 38/62 | 38/62 | 38/62 | 100 | 100 |
| Stearic acid sorbitan ester (parts) | 2.5 | 2.5 | 2.5 | 2.5 | 2.5 |

TABLE 8-continued

| Experiment No. | 29 | 30 | 31 | 32 | 33 |
| --- | --- | --- | --- | --- | --- |
| Tensile yield point (kg/mm$^2$) | 4.4 | 4.1 | 4.3 | 4.3 | 3.8 |
| Izod impact strength (kg cm/cm) | 18 | 19 | 17 | 14 | 11 |
| Melt-flow index (g/10 min.) | 8.4 | 9.5 | 10.2 | 8.3 | 6.5 |
| Chemical resistant property (min.) | 1.2 | 2.1 | 0.1 | 3.5 | 13 |
| Heat stability | A | A | A | A | A |

We claim:

1. A thermoplastic resin composition, which consists essentially of:

(A) 100 parts by weight of a rubber-containing styrene type resin; and (B) 1 to 45 parts by weight of a polymeric substance selected from the group consisting of a homopolymer of an acrylic acid ester, copolymers of an acrylic acid ester, and a mixture of these polymers, said component (B) having a solubility parameter of from 8.4 to 9.8 (cal/c.c.)$^{\frac{1}{2}}$, a glass transition temperature of 20° C. or below, a gel content of 70% by weight or below, and relative viscosity in methylethyl ketone of 20 or below.

2. The thermoplastic resin composition according to claim 1 wherein the rubber-containing styrene type resin of the component (A) is selected from the group consisting of high impact polystyrene, acrylonitrile, butadiene and styrene resin, heat resistant acrylonitrile, butadiene, styrene and alpha-methyl styrene resin, acrylonitrile, acrylic acid ester and styrene resin, acrylonitrile, a terpolymer of ethylene, propylene and a nonconjugated diene and styrene resin and methylmethacrylate, butadiene, acrylonitrile and styrene resin.

3. The thermoplastic resin composition according to claim 1 wherein the polymeric substance of the component (B) is a homopolymer or copolymer of an acrylic acid ester selected from the group consisting of methylacrylate, ethylacrylate, butylacrylate, non-cyclic hexylacrylate, cyclohexylacrylate, octylacrylate, hydroxyethylacrylate, methoxy ethylacrylate and a mixture thereof.

4. The thermoplastic resin composition according to claim 3 wherein the comonomer for the copolymer of the acrylic acid ester is selected from the group consisting of styrene, α-methyl styrene, t-butyl styrene, acrylonitrile, methacrylonitrile, methylmethacrylate, butylmethacrylate, ethylene, propylene, 1-butene, isobutylene, 2-butene, methyl vinyl ether, ethyl vinyl ether and butyl vinyl ether.

5. The thermoplastic resin composition according to claim 1 wherein the polymeric substance of the component (B) is copolymerized with a poly-functional vinyl monomer selected from the group consisting of divinyl benzene, ethylene glycol dimethacrylate, 1,3-butylene glycol dimethacrylate, 1,4-butylene glycol dimethacrylate, propylene glycol dimethacrylate, triallyl cyanurate, triallyl isocyanurate, trimethylol propane trimethacrylate, allylacrylate, allylmethacrylate, vinyl acrylate, vinyl methacrylate, glycidyl acrylate, and glycidyl methacrylate.

6. The thermoplastic resin composition according to claim 1 wherein the solubility parameter of the component (B) is from 8.8 to 9.6 (cal/c.c.)$^{\frac{1}{2}}$.

7. The thermoplastic resin composition according to claim 1 wherein the glass transition temperature of the component (B) is 10° C. or below.

8. The thermoplastic resin composition according to claim 1 wherein the relative viscosity of the component (B) is 10 or below.

9. The thermoplastic resin composition according to claim 1 wherein the component (B) is 3 to 30 parts by weight.

10. The thermoplastic resin composition of claim 2, wherein said rubber-containing styrene type resin is selected from the group consisting of acrylonitrile, butadiene and styrene resin, heat-resistant acrylonitrile, butadiene, styrene and alpha-methyl styrene resin and methylmethacrylate, butadiene, acrylonitrile, and styrene resin.

* * * * *